(12) United States Patent
Repac et al.

(10) Patent No.: US 7,150,214 B2
(45) Date of Patent: Dec. 19, 2006

(54) VEGETABLE CUTTER

(75) Inventors: Cedomir Repac, Brechen (DE);
Branko Culig, Metlika (SI)

(73) Assignee: Petra Repac, Brechen (DE)

( * ) Notice: Subject to any disclaimer, the term of this patent is extended or adjusted under 35 U.S.C. 154(b) by 519 days.

(21) Appl. No.: 10/444,095

(22) Filed: May 23, 2003

(65) Prior Publication Data

US 2004/0103797 A1    Jun. 3, 2004

(30) Foreign Application Priority Data

May 24, 2002    (DE) ................................. 102 23 075

(51) Int. Cl.
*B26D 7/06*    (2006.01)
*A23N 1/00*    (2006.01)

(52) U.S. Cl. ...................... 83/437.2; 83/437.4; 83/857; 83/932; 99/495; 99/538; 241/168; 30/114

(58) Field of Classification Search .................. 99/538, 99/537, 539–545, 547, 555, 556, 588, 643, 99/495; 30/114; 241/168, 169, 169.2; 83/437.2, 83/437.4, 523, 541, 932, 862, 431, 865, 857, 83/620, 425.3, 437.1, 858
See application file for complete search history.

(56) References Cited

U.S. PATENT DOCUMENTS

| 435,235 | A | * | 8/1890 | Maxson ..................... 241/169.1 |
| 1,631,854 | A | * | 6/1927 | Carroll ......................... 99/542 |
| 2,500,973 | A | * | 3/1950 | Ackerman ................... 425/308 |
| 2,867,255 | A | * | 1/1959 | Berney et al. ............ 241/273.2 |
| 3,552,460 | A | * | 1/1971 | Cooney .................... 241/169.1 |
| 3,581,790 | A | * | 6/1971 | Conte ....................... 241/188.1 |
| 3,943,601 | A | * | 3/1976 | Kuhlman ..................... 425/411 |
| 4,311,283 | A | * | 1/1982 | Bounds ........................ 241/95 |
| 4,366,930 | A | * | 1/1983 | Trombetti, Jr. .............. 241/169 |
| 5,947,016 | A | * | 9/1999 | Repac et al. .................. 99/538 |
| 6,018,883 | A | * | 2/2000 | Mulhauser ..................... 34/58 |
| 6,604,454 | B1 | * | 8/2003 | Tateno .......................... 99/510 |

* cited by examiner

*Primary Examiner*—Boyer D. Ashley
*Assistant Examiner*—Ghassem Alie
(74) *Attorney, Agent, or Firm*—Charles P. Boukus, Jr.

(57) ABSTRACT

A vegetable chopper (10) includes a lower housing part (14), which has a knife (16) on its underside and receives a rotatable inner body with a chopping grid (20), the inner body (18) being fillable with the vegetable. Vegetable chopper (10) has an upper housing part (12) with a ram (26) which is disposed on a spindle (24) in the operating state plunges into the inner body (18) and upon rotation of the upper housing part (12) relative to the lower housing part (14) executes an axial motion counter to the chopping grid (20). Vegetable chopper (10) includes a coupling device (28), which in the operating state assure engagement with a thread of the spindle (24) and in the open state allows a free axial displacement of the spindle (24) and ram (26). The coupling device (28) is connected to the upper housing part (12), and the spindle (24) is guided for axial displacement relative to the upper housing part (12) and secured against rotation relative to the upper housing part (12) on the axial guide (34).

16 Claims, 6 Drawing Sheets

VEGETABLE CUTTER

FIELD OF THE INVENTION

The invention relates to a vegetable cutter, having a lower housing part, which has a knife on its underside and receives a rotatable inner body with a cutting grid, the inner body being fillable with the vegetable, in particular garlic, and having an upper housing part with a ram, which is disposed on a spindle and in the operating state plunges into the inner body and upon rotation of the upper housing part relative to the lower housing part executes an axial motion counter to the cutting device, and having coupling means which in the operating state assure engagement with a thread of the spindle and in the open state allow a free axial displacement of the spindle and ram.

One such garlic cutter is known for instance from German Patent DE 198 05 933 C1 to the present Applicant, which is hereby expressly incorporated by reference into the present application. It is understood that this garlic cutter can be used not only for garlic but also as a cutter for other vegetables, such as onions or the like. As the coupling means, all kinds of mechanisms that in the operating state assure engagement with the thread of the spindle carrying the ram and in the open state allow a free axial displacement of the spindle and ram are suitable, such as plastic or metal snap elements or a cap nut, which for instance by rotation causes elements to engage the spindle or to release the spindle. By means of these two different operating states of the spindle that carries the ram, it is attained in the prior art that in operation the thread of the spindle, upon rotation of the upper part, presses the fruit gently or forcefully against the cutting grid, and in the open state, for instance if the counterpart thread is no longer in engagement with the spindle, the spindle can be quickly displaced relative to the nut or ratcheted through. This makes it possible to insert the upper part onto the lower part and remove the upper part from the lower part substantially faster than in previously known devices. Tedious screwing down over the entire thread is not necessary. As a result of these coupling means, the spindle can be put in any arbitrary position on the lower part. The spindle can be blocked in the position, thus attaining the operating state for cutting the garlic.

This facilitates handling greatly. First, the clove of garlic is placed in the inner body of the lower housing part. After that, the upper housing part, with the threaded rod or spindle and the cap nut and ram, is introduced into the lower part. The ram and spindle can be ratcheted through the cap nut until the ram rests on the product to be cut. Then the coupling means and the cap nut are put in the blocking or operating position with the lower part, making the device ready for cutting. The upper part is then rotated, so that the threaded spindle, by means of the counterpart thread pressed on by the cap nut, latches into the lower part and causes the ram to advance and thus brings about cutting of the clove of garlic.

Although this known garlic cutter has proved itself very well in practice and has been successful on the market, there is a need to improve handling still further. In particular, after being filled with material to be cut, the vegetable cutter should be still easier and faster to put into operation. Moreover, in a secondary aspect of the invention, the overall device should be even more attractive in appearance and be easy to clean.

SUMMARY OF THE INVENTION

This object is attained according to the invention, in the vegetable cutter having the characteristics recited at the outset, essentially in that the coupling means is connected to the upper housing part, and that the spindle is guided for axial displacement on the upper housing part.

Because of this provision, the upper housing part and the lower housing part, after the inner body has been filled with product to be cut, can be releasably connected to one another by the coupling means, and the spindle can be displaced freely in the axial motion in the interior of the upper housing part and lower housing part, if the coupling means is in the opening state. In that case, the ram including the spindle can be lowered automatically, for instance by gravity, until the underside of the ram comes to rest on the product to be cut. The coupling means is then switched into the operating state, so that there is provision for engagement with a thread of the spindle; by rotation of the upper housing part relative to the lower housing part, the spindle along with the ram is lowered further in the direction of the cutting grid. As a result, the product to be cut is cut apart into fine rods by the cutting grid, and the rods are diverted on each rotation of the inner body by the knife located below the cutting grid, so that the product to be cut is cut apart into small cubes. This provision also has the advantage that the vegetable cutter or garlic cutter in the operating state has a housing surface that is essentially closed on all sides except for the opening at the bottom from which the cubes of garlic fall out, and this essentially closed housing surface is easy to clean. In the operating state, that is, when the upper housing part is connected to the lower housing part, internal functional parts of the vegetable cutter, such as the spindle or the coupling means which assure engagement with a thread of the spindle are not visible. These functional parts are also thus better protected against becoming soiled. The advantage is also obtained that the dimensions of the housing of the vegetable cutter, particularly in the axial direction, are independent of the quantity of product to be cut that is located in the inner body. Because of this provision, a very attractive appearance of the garlic cutter of the invention is obtained.

In a first independent embodiment of the invention, it is provided that the spindle is subjected to prestressing of a spring, urge the spindle and the ram into a position projecting downward out of the upper housing part. Because of this provision, the ram and spindle, under the influence of the spring force, are always put in the maximally projected position, as long as there is no hindrance to the ram or spindle. If the inner body is not filled with garlic, then by the action of the spring force the ram will rest on the cutting grid, which is secured to the underside of the inner body. However, if a product to be cut, whether garlic or onions, is located in the inner body, then the ram is in a sense lowered automatically by the action of the spring force, until it rests on the product to be cut. By this provision, the ram, if coupling the means is in the open state, is lowered automatically, and even independently of the position of the clove of garlic in space, toward the product to be cut until it rests on it. Once the coupling means is put in the operating state, the upper housing part can then be rotated together with the spindle, so that on each rotation of the upper housing part or spindle, the ram is lowered by one course of the thread of the spindle toward the product to be cut. It is understood that in an opposite direction of rotation, the ram is moved away from the product to be cut.

In another advantageous refinement of the invention, it is provided that the upper housing part is embodied as substantially cup-shaped, and that an axial guide, such as a peg or a tube, on which the spindle is supported, for axial displacement, but secured against rotation relative to the upper housing part, is connected to an inner top portion. First, the provisions assure good axial guidance and somewhat play-free axial displacement of the spindle or ram, even if the spindle or ram protrudes far out of the upper housing part. Second, the ram or spindle, upon a rotation of the upper housing part, is also set into rotary motion, so that the ram plunging into the inner body also puts the inner body into the requisite rotary motion for cutting the product.

In another advantageous provision of the invention, the axial guide and the spindle, for securing against relative rotation, have a tongue and groove connection in slidable engagement with one another, which are preferably disposed in the axial direction and thus allow a linear displacement between the spindle and the axial guide, but prevent a relative rotation.

In another embodiment of the invention, the spindle is formed as a hollow spindle, and the axial guide is received in the interior of the hollow spindle.

It is also possible for the spring to be a compression spring, in particular a helical compression spring, which is disposed between the inner bottom and an annular collar or annular flange of the spindle.

Advantageously, the compression spring is penetrated by the peg or tube acting as an axial guide, so that the compression spring, even in the relaxed state, is securely held or supported in the upper housing part.

It is also provided that the spindle is secured against sliding out of the upper housing part via a stop, and preferably the stop cooperates with a counterpart stop on the coupling means. It is understood that the positioning of this stop and of the counterpart stop, for defining the maximum stroke of the ram or spindle, is adapted to the dimensions of the lower housing part and of the inner body, and the maximum lifting distance of the ram is adapted approximately to the depth of the inner container.

In another advantageous provision, it is provided that the coupling means is embodied as a cap nut that can be placed on the lower housing part, or as a component of such a cap nut. In this sense, a kind of cap nut or the like is provided that can be placed on the lower housing part and that for example by rotation from an open position into a closed position actuates elements for engagement with the spindle or for releasing the spindle.

In another advantageous embodiment of the invention, it is provided that a counterpart thread for the spindle is provided in the cap nut and can be brought into and out of engagement with the thread of the spindle.

Especially advantageously, the cap nut can be secured to the lower housing part by means of a bayonet mount. To that end, the lower housing part preferably has lugs or the like, which protrude from some regions of the circumference and leave the other regions of the circumference open. Thus the nut that is secured to the upper housing part can simply be placed on the lower housing part and locked in a manner known by a short rotation, for instance a one-quarter or one-third turn. Other closure mechanisms, such as being screwed onto its own thread or slipped onto a suitably shaped counterpart element, are equally conceivable.

In another preferred embodiment of the invention, inside the cap nut, the counterpart thread is disposed on the inside of a snap ring, which is received and held in the cap nut and which is pressed against the spindle in the operating state and moves away from it in the open state. In the operating state, the cap nut is simultaneously locked to the lower housing part, while in the open state of the coupling means, the cap nut is unlocked. The alternation between the "operating" and "open" states is effected automatically by rotation of the cap nut on the lower housing part, preferably simultaneously with the locking of the cap nut to the lower housing part via the bayonet mount. These provisions complete prevent mistakes in operation.

A simple realization of this embodiment can be attained by providing that a plurality of lugs, for instance three, are disposed over the circumference of a component, such as the lower housing part, and have increasing thickness over their course, so that once the cap nut has been firmly tightened, the snap ring slides over these steep planes and as a result of the increasing thickness of the lugs is pressed inward and hence against the thread of the spindle. Most expediently, these sliding faces can be provided on the protrusions of the bayonet mount parts that are provided for retention of the cap nut. These protruding parts then perform two functions, namely holding and locking the cap nut, and pushing together or compressing the snap ring, whereupon its counterpart thread is pressed into the thread of the spindle, and the operating state is thus attained.

In another refinement of the invention, a receptacle for a free end of the spindle remote from the ram is provided in the upper housing part, and in the fully retracted position, the spindle is held in clamping fashion in this receptacle. In this sense, it becomes possible for the spindle and the ram, retracted all the way into the upper housing part, to be temporarily fixed in this position. Later, by exertion of a slight tensile force on the ram or spindle, for instance with the user's hand, the spindle can be freed from this clamped fixation, so that the spindle is projected from the upper housing part again by gravity or by the action of the spring prestressing.

The coupling means, in particular the cap nut together with the snap ring received, are connected to the upper housing part rotatably relative to it. Thus once the vegetable cutter is filled and the upper housing part and lower housing part have been connected in detent-locked fashion, with the coupling means put in the operating position, the cutting of the garlic can be initiated by relative rotation of the upper housing part to the lower housing part in the appropriate direction.

In another advantageous provision, it is provided that the coupling means, in particular the cap nut, are latched to the upper housing part.

Finally, it is provided that the cutting grid is connected to the inner body via detent tabs, which are latched in axial slits of the inner body. This provision accomplishes a secure fixation of the cutting grid to the inner body.

It remains to be noted that the knife located on the lower housing part below the cutting grid is secured releasably to the lower housing part, for instance by a bayonet ring, and is thus replaceable. It can also be provided that the opening in the lower housing part, from which the cut material emerges, can be closed by a cap.

Further objects, characteristics, advantages, and possible applications of the present invention will become apparent from the ensuing description of an exemplary embodiment in conjunction with the drawings. All the characteristics described and illustrated in writing or in the drawings are the subject of the present invention either on their own or in arbitrary useful combinations, regardless of how they are defined in the claims or of the claims dependency.

BRIEF DESCRIPTION OF THE DRAWINGS

Shown are.

DETAILED DESCRIPTION OF THE INVENTION

The garlic cutter 10 shown in the drawings has a lower housing part 14, which has a knife 16 on its underside. Received in the interior of the lower housing part 14 is a rotatable inner body 18, which has a cutting grid 20 on its underside. The inner body 18 can be filled with vegetables, preferably garlic 22.

The garlic cutter 10 also has an upper housing part 12, with a ram 26 disposed on a spindle 24. In the operating state, the ram 26 plunges into the inner body 18, and upon rotation of the upper housing part 12 relative to the lower housing part 14 in the appropriate direction of rotation is lowered in an axial motion toward the cutting grid 20, or with the reverse direction of rotation is raised. The rotation of the spindle 24 and ram 26 is transmitted jointly to the rotatable inner body 18, so that it rotates as well in accordance with the rotation of the ram 26.

A coupling means 28 are is also provided that in the operating state assure an engagement with a thread of the spindle 24. In this operating state, a rotation of the spindle 24 about its longitudinal axis causes the ram 26 to be raised or lowered—depending on the direction of rotation—inside the inner body 18.

The coupling means 28 can also be in an open state, in which a free axial displacement of the spindle 24 and ram 26 in the inner body 18 is enabled. By these provisions, the ram 26, if the means 28 is in the open state, can be brought into contact with the product to be cut simply by free axial displacement. Then the coupling means 28 is put in the operating state, so that a free axial displacement of the spindle 24 and ram 26 is now prevented, and the ram 26 is movable only by a rotation of the spindle 24.

Figure 1:
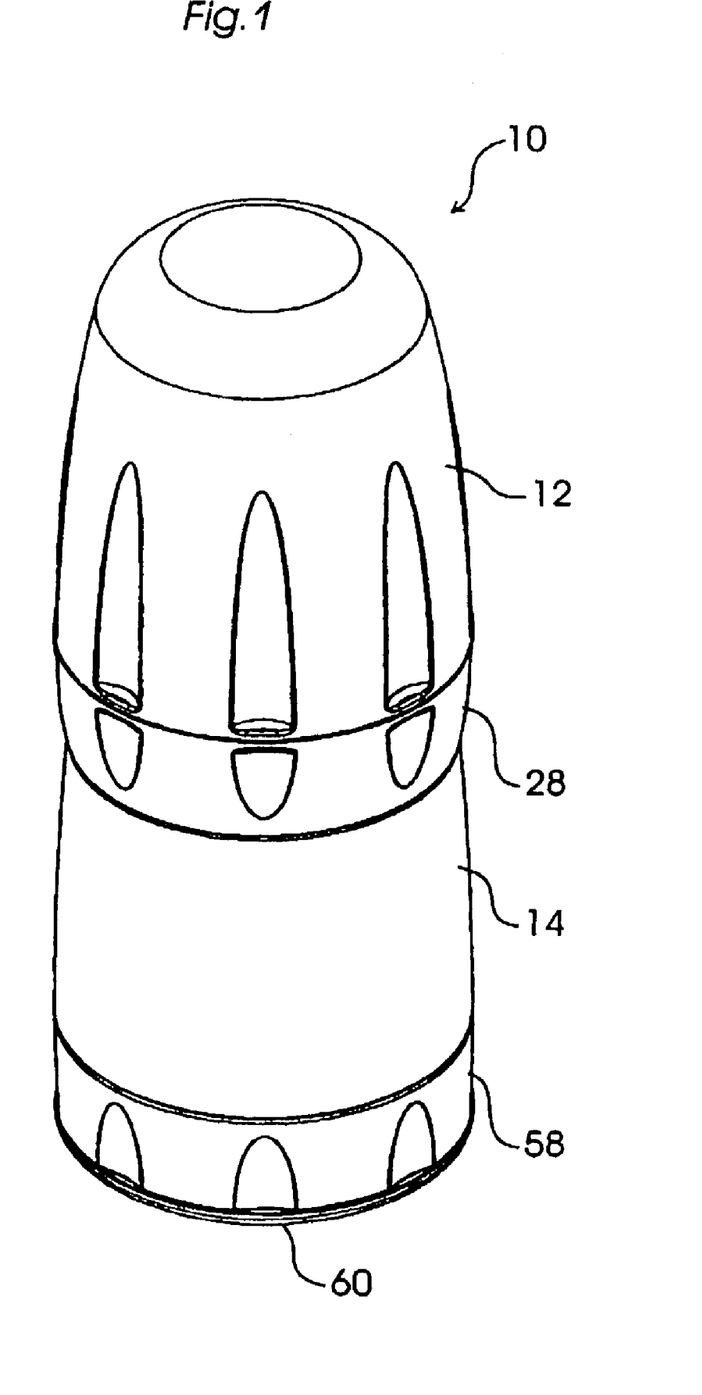
FIG. 1, one exemplary embodiment of the garlic cutter of the invention in perspective.
Figure 2:
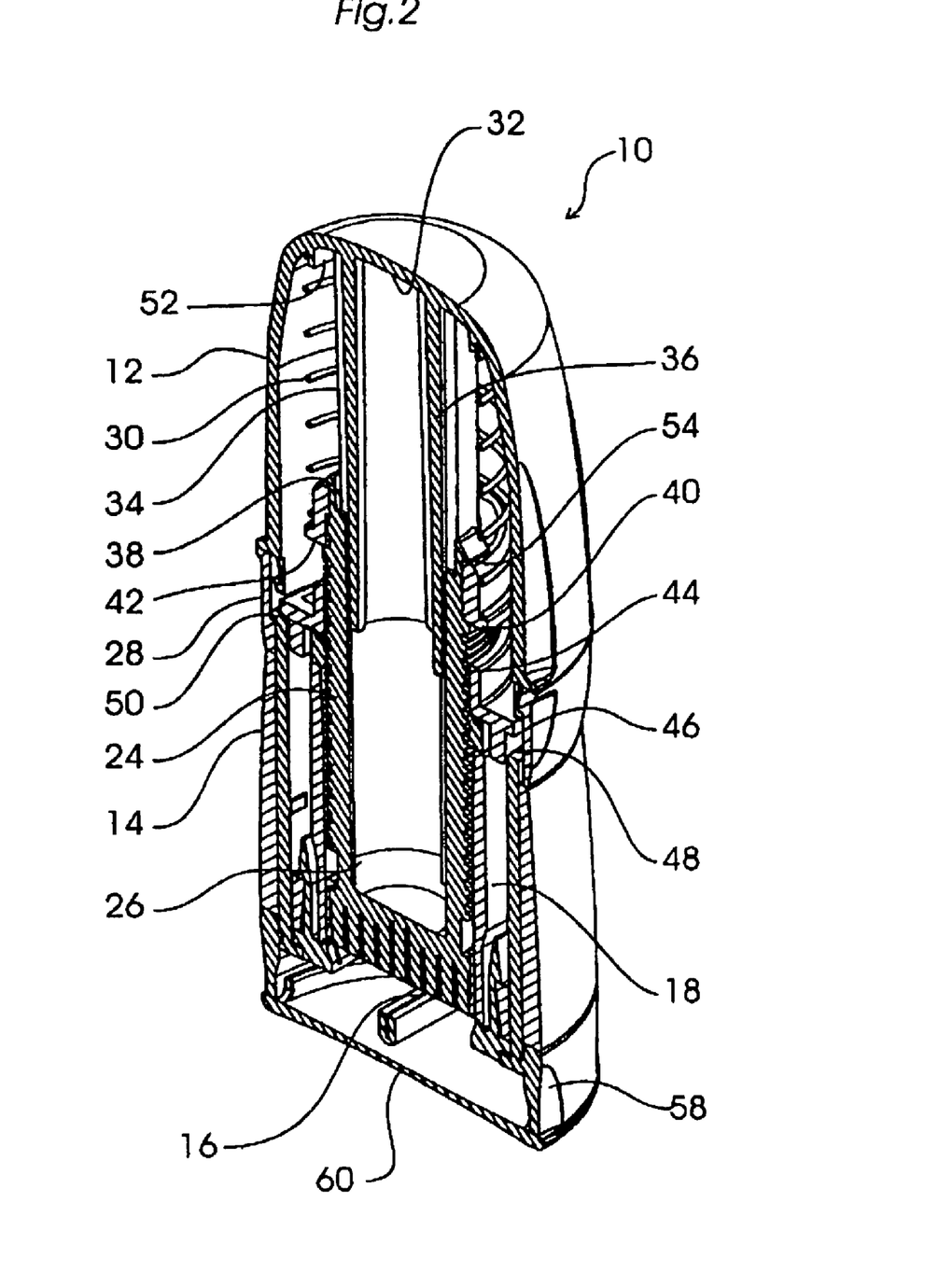
FIG. 2, the garlic cutter of FIG. 1 in perspective, with one half shown cut away, with the inner container empty.
Figure 3:
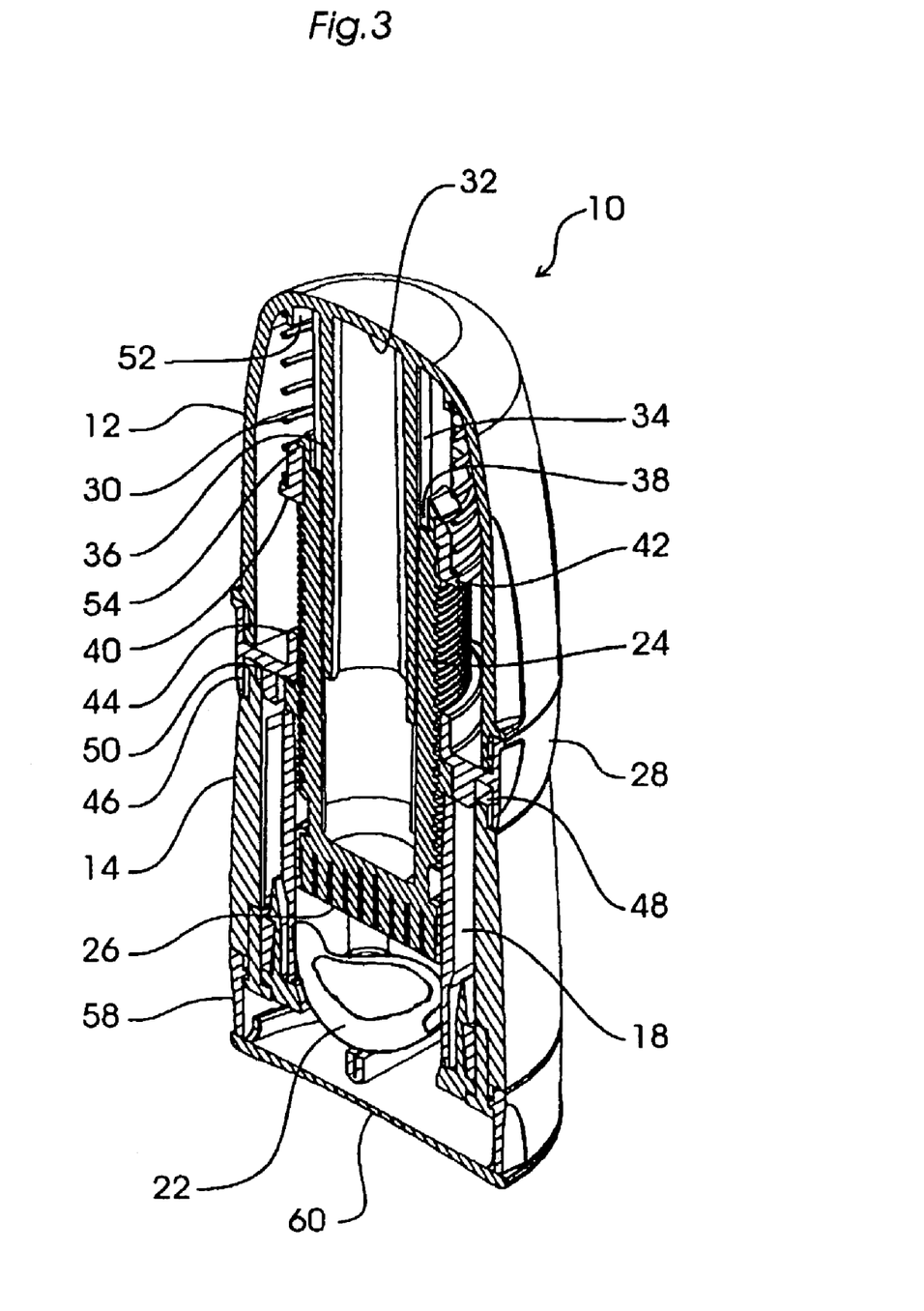
FIG. 3, the garlic cutter of FIG. 2 with the inner container filled with garlic.
Figure 4:
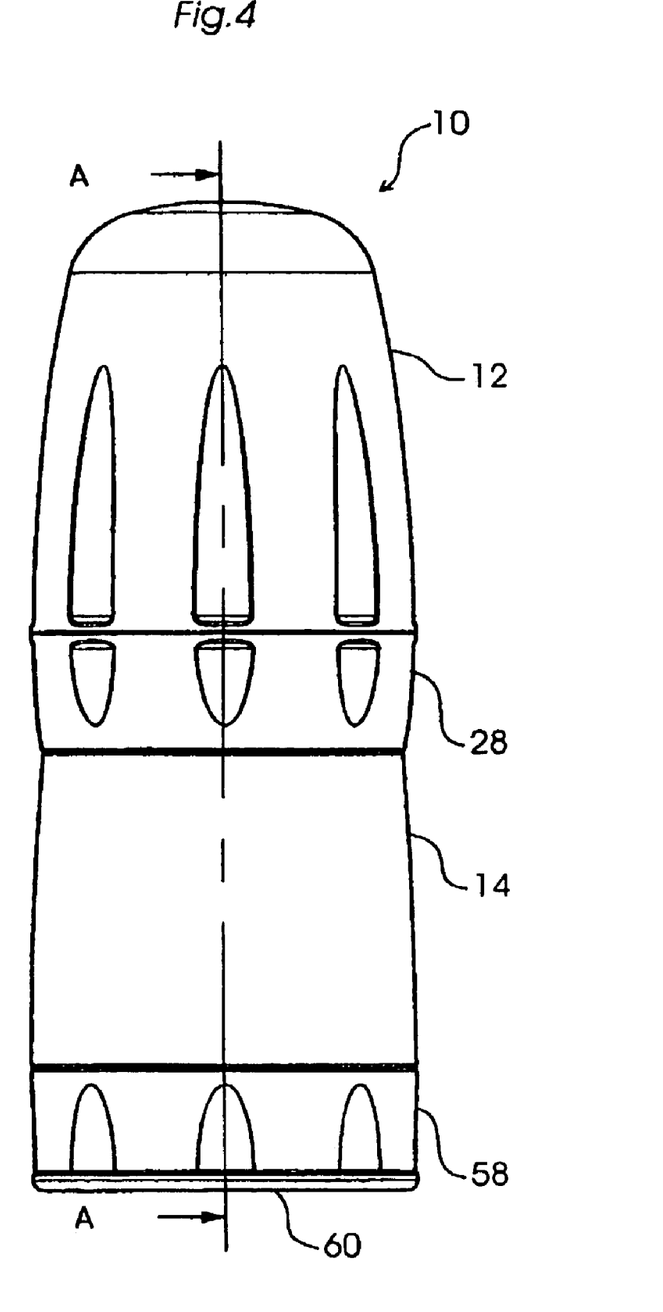
FIG. 4, the garlic cutter of FIG. 1 in a side view.
Figure 5:
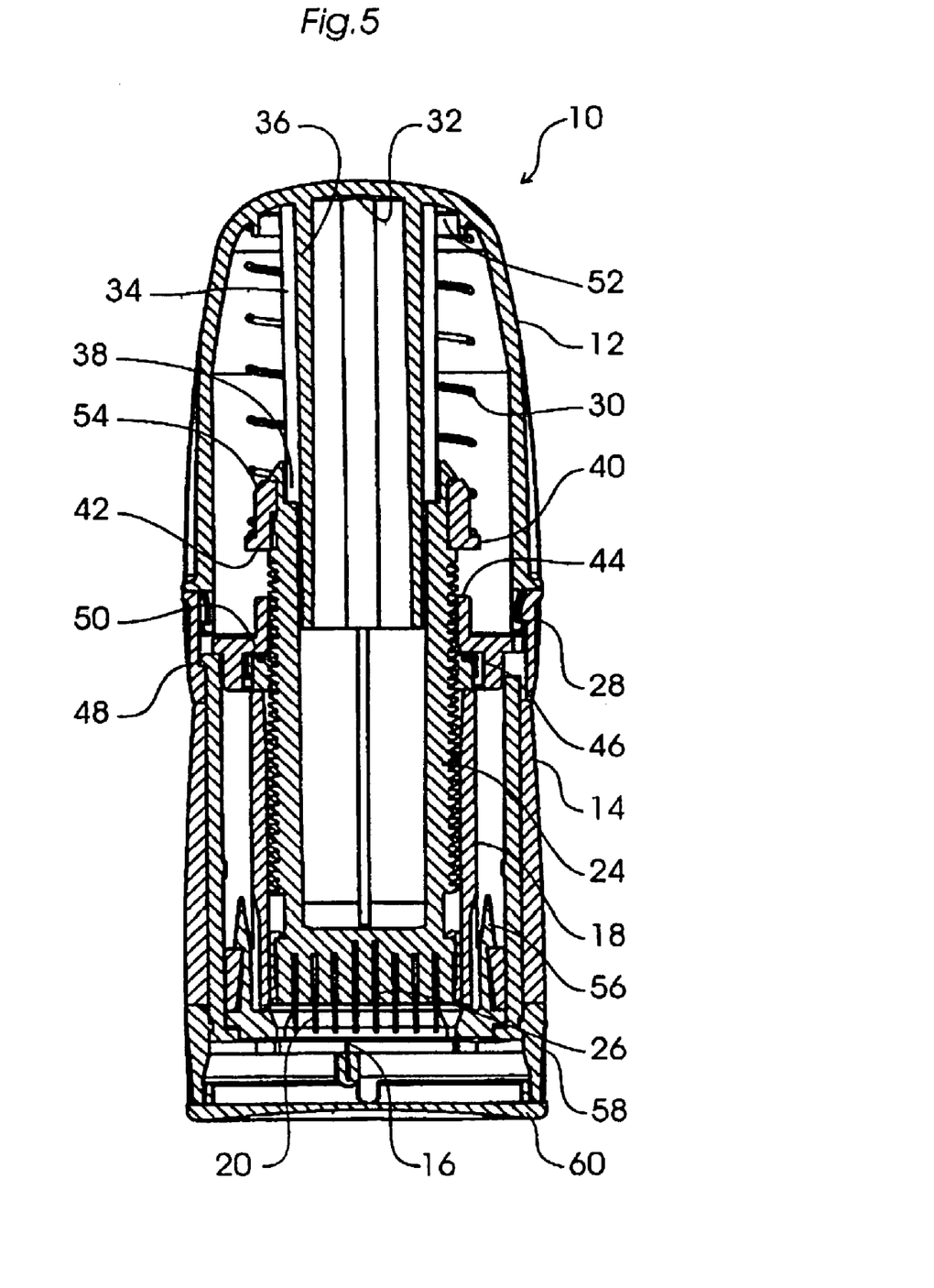
FIG. 5, the garlic cutter of FIG. 2 in a side view.
Figure 6:
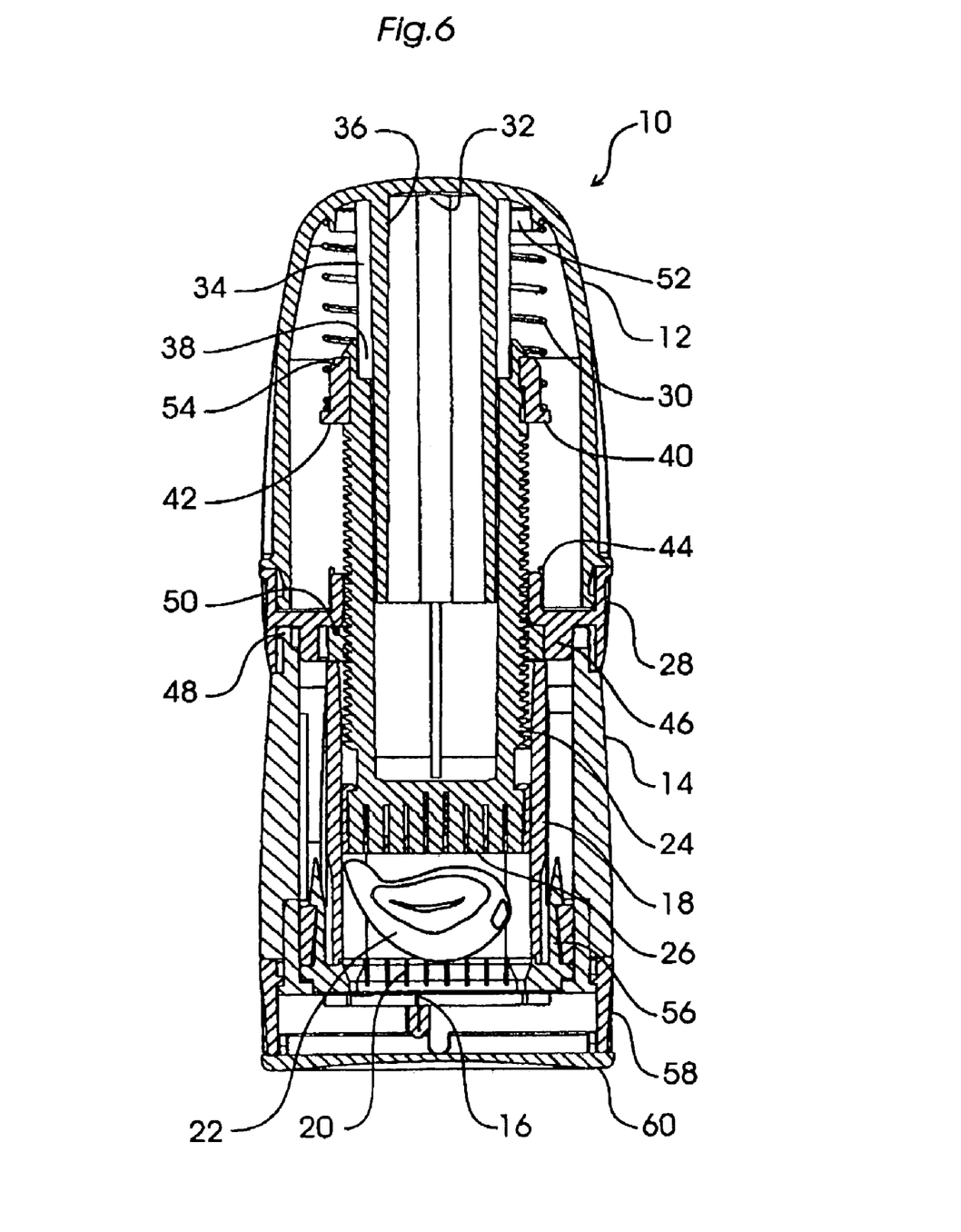
FIG. 6, the garlic cutter of FIG. 3 in a side view.

The coupling means 28 is connected to the upper housing part 12, as can be seen from the drawings. In addition, the spindle 24 and ram 26 are guided for axial displacement relative to the upper housing part 12. In this sense, the upper housing part 12, the coupling means 28, and the spindle 24 and ram 26 form a structural unit; whenever the coupling means 28 is in the open position, the ram 26 and spindle 24 are axially freely displaceable relative to the upper housing part 12 and can be guided into the fully projected position, for instance by the action of gravity. However, if a product to be cut is located in the inner container 18, then the ram 26 and spindle 24 is projected only far enough that the underside of the ram 26 rests on the product to be cut. This process takes place automatically, as long as the coupling means 28 is in the open state. Whatever position the ram 26 assume automatically in the garlic cutter 10 when the coupling means 28 is in the open state is shown in FIGS. 2, 3 and FIGS. 5, 6; in FIGS. 2 and 5, there is no product to be cut in the garlic cutter, while in FIGS. 3 and 6 the situation is shown when garlic 22 is received in the inner container 18.

This process of the automatic lifting of the ram 26 or spindle 24 out of the upper housing part 12 is reinforced by the fact that the spindle 24 is subjected to a prestressing of a spring 30, which puts the spindle 24 or ram 26 into a position in which it is projected downward out of the upper housing part 12. By the use of a spring 30, the process of the free axial displacement of the spindle 24 or ram 26 becomes independent of the action of gravity, so that the outward motion of the ram 26 is then effected independently of position.

As can be seen particularly from FIGS. 2, 3 and FIGS. 5, 6, the upper housing part 12 is substantially cup-shaped, and an axial guide 34, which in particular can be embodied as a peg or tube 36, is connected to an inner top portion 32. The spindle 24 is axially displaceably supported on this axial guide 32, but secured against rotation relative to the upper housing part 12. The axial guide 34 and the spindle 24, for securing against relative rotation, have a tongue and groove connection 38 in slidable engagement with one another. The spindle 24 is preferably embodied as a hollow spindle and receives the axial guide 34 in its interior. The spring 30 is preferably a compression spring, in particular a helical compression spring, which is disposed between the inner bottom 32 and an annular collar 40 or annular flange of the spindle 24. Moreover, the spindle 24 is secured against sliding out of the upper housing part 12 via a stop 42, and this stop 42 preferably cooperates with a counterpart stop 44 on the coupling means 28. A receptacle 52 for a free end 54 of the spindle 24, remote from the ram 26, is also provided in the upper housing part 12, and in the fully retracted position, the spindle is held in clamped fashion in this receptacle.

The coupling means 28 is embodied as a cap nut 46 that can be placed on the lower housing part 14. This cap nut 46 has a counterpart thread for the spindle 24. The cap nut 46 can be secured to the lower housing part 14 by means of a bayonet mount 48. The counterpart thread is preferably disposed on the inside of a snap ring 50, which is received in the cap nut 46 and, in the operating state, is pressed against the spindle 24, or into its thread, and in the open state moves away from the spindle 24, so that the spindle is axially freely displaceable.

The coupling means 28 and the cap nut 46 are preferably latched to the upper housing part 12, but are connected to it rotatably relative to the upper housing part 12. The cutting grid 20 is connected to the inner body 18 via detent tabs 56, which are latched in axial slits of the inner body 18. The knife 16 is releasably fixed to the lower housing part 14 by means of a bayonet ring 58, and the outlet opening for the cut product can be closed by means of a cap 60.

LIST OF REFERENCE NUMERALS

10 Vegetable cutter
12 Upper housing part
14 Lower housing part
16 Knife
18 Inner body
20 cutting grid
22 Garlic
24 Spindle
26 Ram
28 Coupling means
30 Spring
32 Inner bottom
34 Axial guide
36 Tube 38 Tongue and groove connection
40 Annular band
42 Stop
44 Counterpart stop
46 cap nut
48 Bayonet mount
50 Snap ring
52 Receptacle
54 Free end
56 Detent tab
58 Bayonet ring
60 Cap

The invention claimed is:

1. A vegetable cutter (10) having a lower housing part (14), which has a knife (16) on its underside and receives a rotatable inner body (18) having a cutting grid (20), the inner body (18) being fillable with the vegetable, and said vegetable cutter having an upper housing part (12) with a ram (26), which is disposed on a spindle (24) and in the operating state plunges into the inner body (18) and upon rotation of the upper housing part (12) relative to the lower housing part (14) executes an axial motion counter to the cutting grid (20), and said vegetable cutter further having a coupling means (28) for coupling the upper housing part (12) to the lower housing part (14), said couling means (28) being operable between an operating state to provide engagement with a thread of the spindle (24) and an open state to allow a free axial displacement of the spindle (24) and changed to the ram (26), and the coupling means (28) being connected to the upper housing part (12), and that the spindle (24) being guided for axial displacement relative to the upper housing part (12) on an axial guide (34) on the upper housing part (12) and secured against rotation relative to the upper housing part (12) on the axial guide (34).

2. The vegetable cutter of claim 1, characterized in that the spindle (24) is subjected to prestressing of a spring (30), which urges the spindle (24) and the ram (26) into a position projecting downward from the upper housing part (12).

3. The vegetable cutter of claim 1, characterized in that the upper housing part (12) is embodied as substantially cup-shaped, and that the axial guide (34) is connected to an inner top portion (32) of the upper housing part 12.

4. The vegetable cutter of claim 3, characterized in that the axial guide (34) and the spindle (24) have a tongue and groove connection (38) in slidable engagement with one another for securing the axial guide 34 and the spindle (24) against relative rotation.

5. The vegetable cutter of claim 1, characterized in that the spindle (24) is embodied as a hollow spindle, and the axial guide (34) is slidably received in the interior of the hollow spindle.

6. The vegetable cutter of claim 3, characterized in that the spring (30) is a compression spring, which is disposed between the inner top portion (32) and an annular collar (40) or annular flange of the spindle (24).

7. The vegetable cutter of claim 1, characterized in that the spindle (24) is secured against sliding out of the upper housing part (12) via a stop (42), and the stop (42) cooperates with a counterpart stop (44) on the coupling means (28).

8. The vegetable cutter of claim 1, characterized in that the coupling means (28) is embodied as a cap nut (46) that can be placed on the lower housing part (14).

9. The vegetable cutter of claim 8, characterized in that the spindle (24) is threaded and the cap nut (46) has a counterpart thread for receiving the threaded spindle (24).

10. The vegetable cutter of claim 8, characterized in that the cap nut (46) can be secured to the lower housing part (14) by a bayonet mount (48).

11. The vegetable cutter of claim 1, characterized in that a counterpart thread is disposed on the inside of a snap ring (50), which is pressed against the spindle (24) in the operating state and moves away from the spindle (24) in the open state.

12. The vegetable cutter of claim 1, characterized in that in the upper housing part (12), a receptacle (52) for a free end (54) of the spindle (24) remote from the ram (26) is provided, in which, in the fully retracted position, the spindle (24) is held in clamping fashion.

13. The vegetable cutter of claim 1, characterized in that the coupling means (28) is rotatably connected to the upper housing part (12).

14. The vegetable cutter of claim 1, characterized in that the coupling means (28) is latched to the upper housing part (12).

15. The vegetable cutter of claim 1, characterized in that the cutting grid (20) is connected to the inner body (18) via detent tabs (56), which are latched in axial slits of the inner body (18).

16. The vegetable cutter of claim 3, characterized in that the axial guide (34) comprises a peg or tube (36).

* * * * *